United States Patent [19]

Carter

[11] Patent Number: 5,042,838

[45] Date of Patent: Aug. 27, 1991

[54] ATTACHMENT FOR BELT RESTRAINING APPARATUS

[76] Inventor: Richard E. Carter, 1201 N. 6th St., Longview, Tex. 75601

[21] Appl. No.: 493,622

[22] Filed: Mar. 15, 1990

[51] Int. Cl.⁵ ...................... B60R 22/00; B60R 22/30
[52] U.S. Cl. .................................... 280/808; 297/483
[58] Field of Search ............... 280/801, 808; 297/482, 297/483; 24/335, 336, 531, 545, 561, 562, 563

[56] References Cited

U.S. PATENT DOCUMENTS

| | | | |
|---|---|---|---|
| 2,775,804 | 1/1957 | Ayoub | 24/336 |
| 3,860,261 | 1/1975 | Takada | 297/483 |
| 3,965,540 | 6/1976 | Moore | 24/336 |
| 4,262,933 | 4/1981 | Fox | 280/808 |
| 4,587,818 | 5/1986 | Griffin | 24/336 |
| 4,786,078 | 11/1988 | Schreier et al. | 280/808 |
| 4,796,919 | 1/1989 | Linden | 280/808 |
| 4,799,737 | 1/1989 | Greene | 280/808 |
| 4,832,367 | 5/1989 | Lisenby | 280/808 |
| 4,938,535 | 7/1990 | Condon et al. | 280/808 |

FOREIGN PATENT DOCUMENTS

| | | | |
|---|---|---|---|
| 3132735 | 3/1983 | Fed. Rep. of Germany | 297/482 |
| 53268 | 3/1987 | Japan | 297/483 |
| 88/04622 | 6/1988 | World Int. Prop. O. | 280/801 |

Primary Examiner—Charles A. Marmor
Assistant Examiner—Tamara L. Finlay
Attorney, Agent, or Firm—Norman B. Rainer

[57] ABSTRACT

An attachment is provided for enabling the shoulder belt portion of a restraining device as employed in automotive vehicles to be positionally adjusted for the comfort of the wearer. The attachment, having a rigid base panel with front and rear faces, slidably engages the lap belt portion of the restraint device by clamping elements associated with said rear face. An elongated hook member disposed upon said front face is adapted to slidably engage the shoulder belt.

3 Claims, 1 Drawing Sheet

ATTACHMENT FOR BELT RESTRAINING APPARATUS

BACKGROUND OF THE INVENTION

This invention relates to belt restraints used for restraining a passenger while seated in a motor vehicle and more particularly to an automobile belt restraining apparatus which provides improved passenger comfort.

Most motor vehicles contain some type of belt restraint which is used to restrain persons seated in the vehicle. A common form of belt restraint is the three-point type having a combination of a shoulder belt and lap belt, with the shoulder belt extending from an upper part of the vehicle frame diagonally across the shoulder and chest of an adult passenger or neck and shoulder of a child, and interconnecting with the lap belt which extends across the person's lap. Although this three-point belt restraint has proven to be one of the safest belt restraints currently used in motor vehicles, many passengers, especially children find the shoulder belt uncomfortable, since it engages the neck, causing a rubbing of the skin and chaffing. Women encounter particular discomforts with improperly positioned shoulder belts.

Heretofore, attempts have been made to position the belt away from the passenger's neck without sacrificing the practical safety of the belt. For example, one prior device uses the door of the vehicle to support a bracket and flexible strap to pull the shoulder belt away from the passenger's neck, while other prior devices adjust the height of the shoulder belt through an auxiliary strap. However, it is believed these devices have not proven to be commercially successful, since they are cumbersome, difficult to use, and in some instances thwart the safe operation of the restraining apparatus.

It is accordingly an object of the present invention to provide an attachment for a belt restraining apparatus comprised of a shoulder belt interconnected to a lap belt, said attachment functioning to adjust the location of the site of interconnection of the shoulder belt with the lap belt, to thereby improve passenger comfort.

It is another object of this invention to provide an attachment as in the foregoing object which does not interfere with the normal functioning of the belt restraining apparatus.

These objects and other objects and advantages of the invention will be apparent from the following description.

SUMMARY OF THE INVENTION

The above and other beneficial objects and advantages are accomplished in accordance with the present invention by a holding bracket adapted to be slidably positionable upon the lap belt portion of belt restraint having a shoulder belt extending upwardly from said lap belt portion, said bracket comprising:

a) a rigid base panel of substantially rectangular contour having front and rear faces, upper and lower edges, and parallel side edges, and a center axis of elongation, b) an elongated hook member emergent from said upper edge as a continuous integral extension of said base panel extending perpendicularly toward said lower edge at a substantially uniform distance of separation from the front face of said panel, and terminating in a distal extremity bent away from said panel, and c) clamp means emergent from said upper and lower edges as continuous integral extensions of said base panel, and disposed in facing relationship with said rear face, the spacing between said clamp means and rear face being comparable to the thickness of said lap belt portion, whereby, d) said lap belt portion may be frictionally engaged by said clamp means, and said shoulder belt may be retained in freely slidable relationship by said hook member and thereby adjusted to a comfortable angle with respect to said lap belt portion.

In preferred embodiments, the holding bracket of this invention is a monolithic structure fabricated of an engineering grade thermoplastic resin by a molding operation. Suitable resins include polyamides, polyesters, polycarbonates, polyacetals and equivalent resins. The clamp means may be comprised of four clamp members employed in opposed paired relationship in a manner to provide a track-like embrace of said lap belt portion.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENTS

Figure 1:
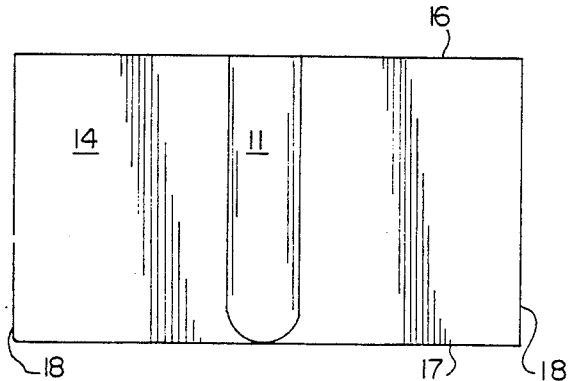
FIG. 1 is a front view of an embodiment of the holding bracket of this invention.
Figure 2:
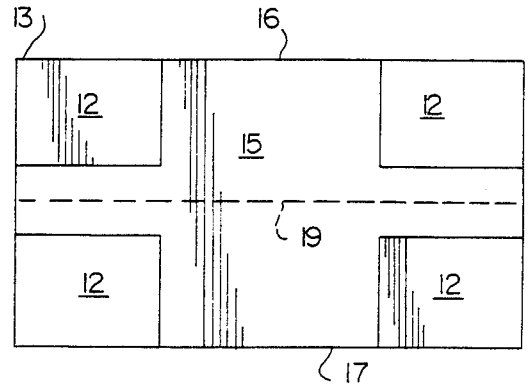
FIG. 2 is a rear view of the embodiment of FIG. 1.
Figure 3:
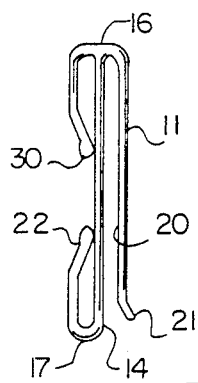
FIG. 3 is a side view of the embodiment of FIG. 1.
Figure 4:
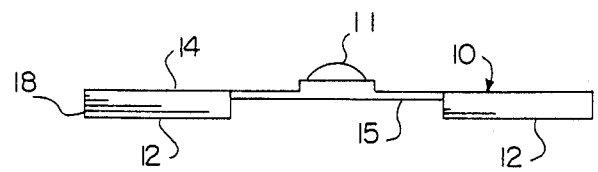
FIG. 4 is a top view of the embodiment of FIG. 1.

Referring to FIGS. 1-4, an embodiment of the holding bracket of the present invention is shown as a monolithic structure comprised of rigid base panel 10 having an elongated hook member 11 and clamp means in the form of four clamp members 12, said hook and clamp members being continuous integral extensions of said base panel.

The illustrated embodiment of base panel 10 is of substantially rectangular contour having corners 13 and bounded by front and rear faces 14 and 15, respectively, upper and lower edges 16 and 17, respectively, and parallel side edges 18. The base panel may be further characterized as having a lateral center axis of elongation 19.

Elongated book member 11 emerges from upper edge 16 as a continuous integral extension of said base panel and extends perpendicularly toward lower edge 17. The exemplified hook member is of substantially flat construction, having a flat inner face 20 uniformly spaced from front face 14. The distal extremity 21 of hook member 11 is positioned slightly above lower edge 17, and is slightly upturned away from base panel 10. The spacing distance between inner face 20 and front face 14 is such as to accommodate a shoulder belt in freely sliding relationship.

Two of said four clamp members 12 are emergent from upper edge 16 as continuous integral extensions of base panel 10, and the other two clamp members are emergent from lower edge 17 as continuous integral extensions of base panel 10. The illustrated clamp members are of substantially square contour and disposed upon the rear face of said base panel. Each clamp member terminates in a distal extremity 22 directed toward center axis 19 and resiliently contacting said rear face. An upturned edge 30 is located on each distal extremity at a site closer to axis 19 than the site of contact of said distal extremity with said rear face. The clamp members from upper and lower edges are positioned in opposed relationship in a substantially square locus. By virtue of such configuration and disposition of the clamp members, the holding bracket can be placed upon and removed from the lap belt at any location thereof. Once placed upon the lap belt, the clamp members grip the lap belt in track-like manner, enabling the holding bracket to be slidably forced to any desired location upon the lap belt, at which location the holding bracket will remain until deliberately re-positioned by the wearer.

Figure 5:
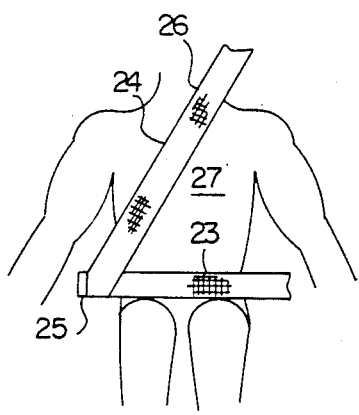
FIG. 5 illustrates the configuration of a generally known three point restraint device.

FIG. 5 illustrates a conventional three point belt restraint comprised of lap belt 23, shoulder belt 24, and buckle 25. It is seen that the upright angular path of the shoulder belt causes it to contact the neck 26 of the wearer 27.

Figure 6:
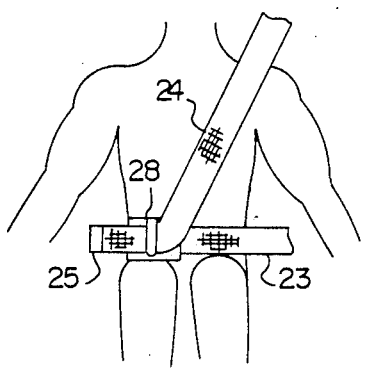
FIG. 6 illustrates the modification of the configuration of a three point restraint device equipped with the holding bracket of this invention.

FIG. 6 illustrates the use of the holding bracket 28 of this invention on the belt restraint of FIG. 5. The holding bracket is applied to lap belt 23 so that the rear face of base panel 10, by virtue of clamping members 12, is held flat against the lap belt while disposing upper edge 16 upwardly. Such manner of positioning disposes hook member 11 downwardly such that it may slidably engage shoulder belt 24 at a site which displaces the shoulder belt from the wearer's neck. Such manner of function of the holding clamp of this invention is therefore capable of improving the comfort of the wearer without causing difficulty of use or adjustment and without compromising the basic safety features of the belt restraint.

Figure 7:
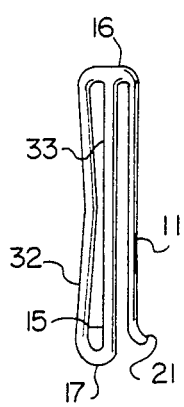
FIG. 7 is a side view of an alternative embodiment of the holding bracket of this invention.

In the alternative embodiment of FIG. 7, the clamp means is comprised of one or more securing members 32 which extend across rear face 15 as a continuous band between said upper and lower edges, defining an enclosed space 33 adapted to receive the lap belt. At its point of closest approach to said rear face, the distance of separation of securing member 32 from base panel 10 is approximately the thickness of the lap belt. By virtue of such construction, the securing members embrace the lap portion so that the holding bracket can be pulled along the lap belt to a desired position where it will remain by frictional force. The alternative embodiment is preferably emplaced upon the lap belt as original equipment during manufacture of the vehicle.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A holding bracket adapted to be slidably positionable upon the lap belt portion of belt restraint having a shoulder belt extending upwardly from said lap belt portion, said bracket comprising:
   a) a rigid base panel of substantially rectangular contour having front and rear faces, upper and lower edges, parallel side edges, and a center axis of elongation extending between said side edges,
   b) an elongated hook member emergent from said upper edge as a continuous integral extension of said base panel extending perpendicularly toward said lower edge at a substantially uniform distance of separation from the front face of said panel, and terminating in a distal extremity bent away from said panel, and means emergent from said upper and lower edges
   c) clamp means emergent from said upper and lower edges as continuous integral extensions of said base panel, and disposed in facing relationship with said rear face, the spacing between said clamp means and rear face being comparable to the thickness of said lap belt portion, whereby,
   d) said lap belt portion may be frictionally engaged by said clamp means, and said shoulder belt may be retained in freely slidable relationship by said hook member and thereby adjusted to a comfortable angle with respect to said lap belt portion.

2. The holding bracket of claim 1 fabricated as a monolithic structure of an engineering grade thermoplastic resin by a molding operation.

3. The holding bracket of claim 1 wherein said clamp means is comprised of four clamp members in opposed paired relationship to provide a track-like embrace of said lap belt portion.

* * * * *